Aug. 18, 1953  J. M. SLATER ET AL  2,649,264
FLIGHT CONTROL SYSTEM
Filed March 15, 1947  3 Sheets-Sheet 2

INVENTORS
JOHN M. SLATER
WALTER WRIGLEY
BY
Herbert P. Thompson
their ATTORNEY

Patented Aug. 18, 1953

2,649,264

UNITED STATES PATENT OFFICE 2,649,264

FLIGHT CONTROL SYSTEM

John M. Slater, Garden City, N. Y., and Walter Wrigley, Wollaston, Mass., assignors to The Sperry Corporation, a corporation of Delaware Application March 15, 1947, Serial No. 734,922

34 Claims. (Cl. 244—77)

This invention relates to automatic flight control systems for dirigible craft and missiles, and, in particular, relates to flight control apparatus for automatically producing control moments for entering and maintaining a craft or a missile in a predetermined flight pattern, be that pattern one for producing straight and level flight, banked turns, or complex maneuvers such as steeply climbing turns.

More particularly, the primary object of the instant invention is to provide an auto pilot which is primarily based on torqued gyros or rate gyros which move with the craft or missile in order to facilitate the execution of acrobatic maneuvers, while simultaneously preserving attitude references with respect to the earth ("attitude" herein being intended to include heading references as well as the usual level indicating references). Conventional auto pilots based on gyro verticals and directional gyros are adequate for ordinary civil and military maneuvers, but it is very difficult to make these pilots control very steep turns, or spiral turns. On the other hand, while flight control systems employing torqued gyros, or rate gyros afford uniform control action in all attitudes, there is no simple or obvious way to preserve earth references during maneuvers. The present invention provides a system combining the virtues of each of the aforementioned types of auto pilots. Specifically, aircraft referenced gyros or other angular movement responsive devices of inertial type (see below) are herein provided for obtaining short period control, while earth referenced gyros serve as monitors, thereby providing long period control and furthermore means are provided whereby proper signals are supplied to aircraft gyros to make maneuvers with respect to earth axes.

Angular velocities (and accelerations) about aircraft axes are not the same as those about the earth referenced axes except in the one special case of level flight. For example, in a climbing turn, craft heading changes, and craft angle of bank and craft angle of elevation remain constant, but angular velocities occur about all three primary craft axes.

It is a further object of the instant invention to provide a system for supplying proper signals to craft control-moment producing mechanisms for making turns or other maneuvers wherein said proper signals are dependent upon measures of angular velocities that must exist about each craft axis if said predetermined maneuver is to be evolved.

The equations that follow set forth the relations that exist between an earth-referred coordinate system and a craft referred coordinate system, where, in the case of the earth-referred coordinate system, three primary axes are denoted as $X_e$, $Y_e$ and $Z_e$, (the $X_e$ axis being north-south, the $Y_e$ axis being east-west and the $Z_e$ axis extending downwardly), and where, in the craft axes (longitudinal, transverse and perpendicular) are referred to as $X_a$, $Y_a$, and $Z_a$. Further, heading is defined as the angle between the $X_e$ axis and the projection of $X_a$ on a horizontal plane, and is denoted by $\phi$. Rate of change of heading, or rate of turn is denoted by $\dot{\phi}$. Angle of bank is defined as the angle between the $X_e$—$Z_e$ plane and the $X_e$—$Z_a$ plane, and is denoted by $\theta_B$. Angle of elevation is defined as the angle between the $X_a$ axis and its projection on a horizontal plane, and is denoted by $\theta_E$.

Any maneuver of a craft, however complex, can be regarded at any instant as involving merely a rotation about some axis and a translation along some direction. In most cases the axis about which rotation takes place is a vertical one, that is, most turns, whether level or climbing, are made about a vertical axis. Furthermore, ordinarily the only translation that is desirable is that along the instantaneous flight path, that is, side-slip and skid are to be prevented. Thus one object of the invention is to cause angular velocity components about the three aircraft axes which are such as to cause a predetermined angular velocity to take place about a vertical axis. This is achieved by a computing and control system which, on actuation, causes components of angular velocity $W_{x_a}$, $W_{y_a}$, $W_{z_a}$, which correspond to a given rotation rate $\dot{\phi}$ about a vertical axis, these components being defined by the expressions $$W_{x_a} = \dot{\phi} \sin \theta_E$$
$$W_{y_a} = \dot{\phi} \sin \theta_B \cos \theta_E$$
$$W_{z_a} = \dot{\phi} \cos \theta_B \cos \theta_E$$

Furthermore, in order to prevent side-slip or skid, in accordance with the invention the aircraft is banked to an angle related to the given rate of turn by the expression $$\theta_B = \tan^{-1}\left(\frac{\dot{\phi} V}{g}\right)$$

Where $V$=true airspeed, and $g$=acceleration of gravity. A more general expression to include climbing turns is $$\theta_B = \tan^{-1}\left(\frac{\dot{\phi} V \cos \theta_E}{g}\right)$$

The instant invention additionally recognizes that while in some instances it may be desirable to produce a computed craft bank angle in accordance with a predetermined craft rate of turn, in some other instances it may be desirable to produce a computed craft rate of turn in accordance with a predetermined craft bank angle. For example, in bombing and certain other military maneuvers it is desirable to predetermine rate of turn, and let the bank angle be a dependent variable, whereas in ordinary civil flying, the converse arrangement is preferable as it avoids the possibility of an excessively great bank angle inadvertently being set in at high airspeeds. The equation for computing a craft rate of turn ($\dot{\phi}$) for a predetermined craft bank angle ($\theta_B$) would be $$\dot{\phi} = \frac{g \tan \theta_B}{V}$$

or, a more general expression to include climbing turns is $$\dot{\phi} = \frac{g \tan \theta_B}{V \cos \theta_E}$$

Heretofore, systems have been provided to include rate sensitive gyros positioned in certain craft axes coupled with means for biasing these gyros in accordance with functions of rate of turn and craft bank angle. For example, Thiry, in U. S. Patent 2,190,390, proposes such a system. However, these systems provide only an approximate solution of the craft angular rates and consideration of the angular rates involved in climbing or gliding turns is entirely overlooked. At best, these systems afford only an approximate solution even in level or constant altitude terms. The approximation and limitations of the systems known to the art have been removed by the features of the instant invention and a system for supplying proper signals to the craft for achieving complex maneuvers is herein provided which is completely general for steeply banked turns at constant altitude, or for steep climbing or descending turns.

The invention also relates to the novel features or principles of the instrumentalities described herein, whether or not such are used for the stated objects, or in the stated fields or combinations.

Other objects and advantages will become apparent from the specification, taken in connection with the accompanying drawings, wherein.

Figure 1:
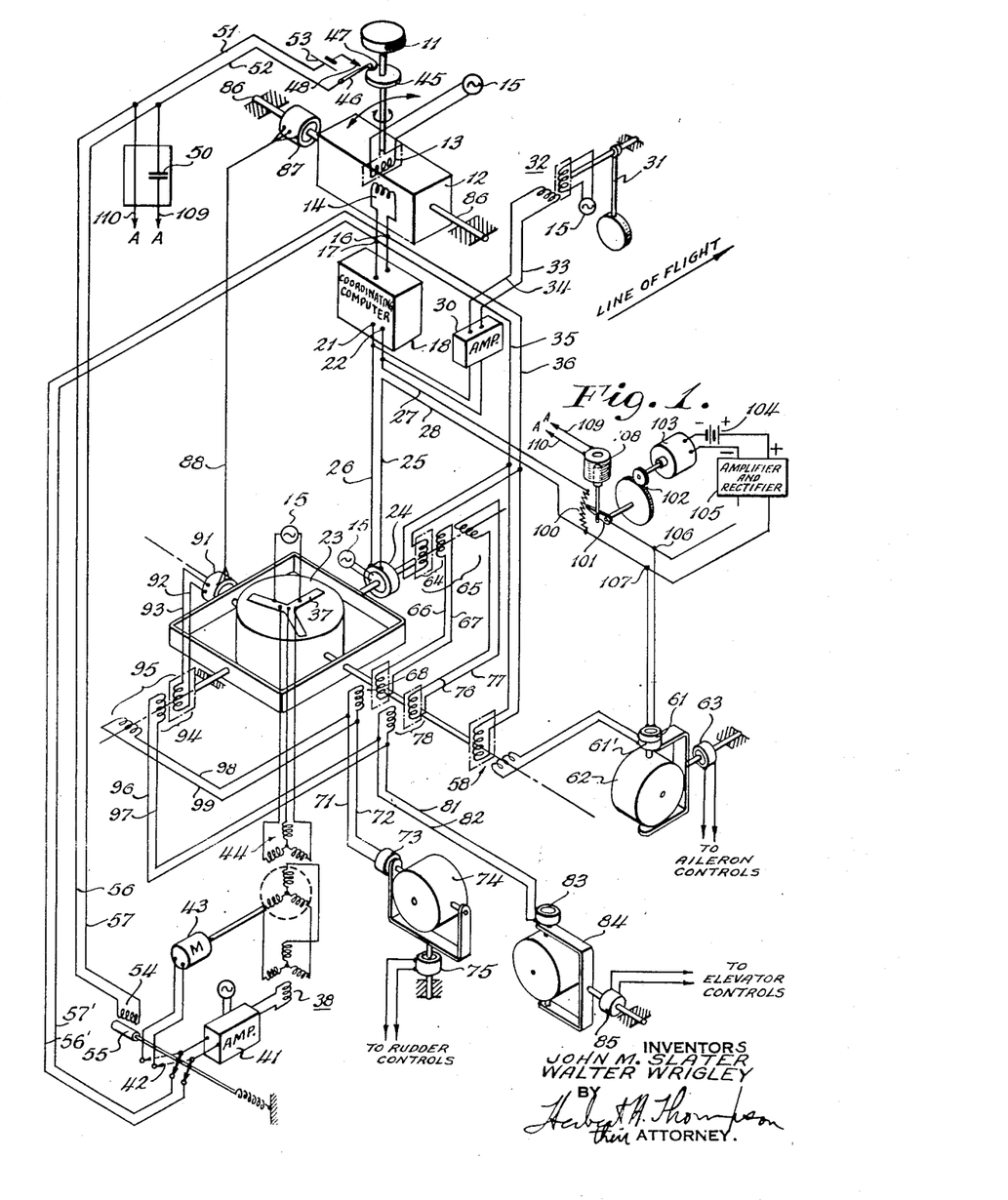
Fig. 1 is a schematic illustration of a flight control system embodying features of the instant invention.
Figure 2:
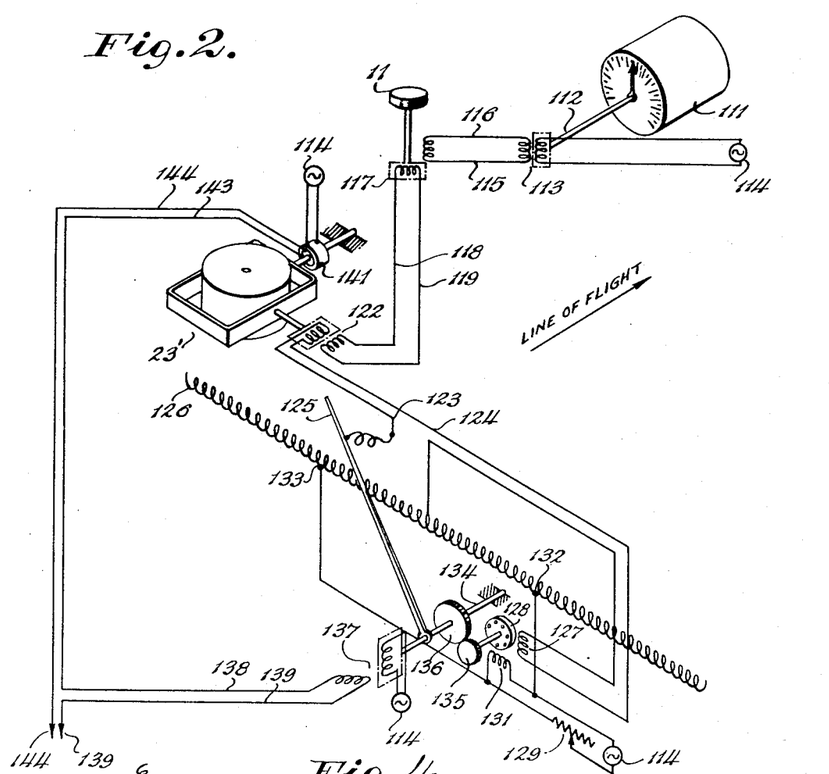
Fig. 2 is a schematic illustration of a computer mechanism for the system of Fig. 1.

Referring now to the drawings, Fig. 1 sets forth an embodiment of the instant invention wherein rate of turn is predetermined and control moments are applied to appropriate craft control devices in accordance with the predetermined rate of turn. In Fig. 1, the control knob 11 is provided with a signal generator 12 including the winding 13 which is operatively associated to be turned by the knob 11 and the winding 14 which is relatively fixed within the generator 12. Coil 13 is energized by the source 15, and the coils 13 and 14 are arranged so that for various positions the knob 11, each reflecting a predetermined rate of turn, a signal of phase and amplitude corresponding to the sense and magnitude of displacement of knob 11 will appear between points 16 and 17 of the signal generator 12. The output from the signal generator 12 thusly appearing at points 16 and 17 is thereupon supplied as an input of the computer 18. Computer 18 will be more fully described in relation to the disclosure of Fig. 2. For the present computer 18 may be considered to have an output in accordance with the equation $$\theta'_B = \tan^{-1}\left(\frac{\dot{\phi} V \cos \theta_E}{g}\right)$$

where $\theta'_B$ = computed angle of bank for a predetermined rate of turn ($\dot{\phi}$); $V$ = craft airspeed; $\theta_E$ = craft angle of elevation or pitch angle; and $g$ = acceleration of gravity. As will be later described in detail, the signal appearing between points 21 and 22, or the output of computer 18, will be a signal dependent upon the computed bank angle $\theta'_B$ for the given or predetermined rate of turn $\dot{\phi}$ as set in at knob 11. The vertical gyro 23 is provided to establish a reference responsive to actual craft bank angle ($\theta_B$) and is mounted in the craft with a pick-off 24 which may be of the selsyn type. The signal produced in lines 25 and 26 by the pick-off 24 will be in proportion to the actual craft bank angle ($\theta_B$). If the computed craft bank angle ($\theta'_B$) differs from the actual craft bank angle ($\theta_B$) a signal will appear across the lines 27 and 28 which will be dependent upon the difference between the computed and the actual craft bank angle.

As has been previously described herein, a signal that is responsive to the preedtermined rate of turn, as set in the knob 11, is produced between the points 16 and 17. However, there are two further factors that affect craft rate of turn which must be considered in any complete system. These factors arise, firstly, in the event the craft inadvertently undergoes a slip or a skid condition, and secondly, in the event there occurs a residual heading error after the craft has completed a turn. The apparatus, in this embodiment, for solving the problems that arise from these two factors will be considered in the above order. In theory no side-slip will occur because computer 18, being more properly referred to as a coordinating computer, though hereinafter referred to as a computer, keeps the bank angle adjusted to satisfy the dynamical considerations expressed in the equation $$\theta_B' = \tan^{-1}\left(\frac{\dot{\phi} V \cos \theta_E}{g}\right)$$

Should any side-slip occur, by reason of an error in air speed data, for example, it is removed by means of a slip and skid detector, in this instance the pendulum 31, which is provided with a signal generator 32, and is energized by the source 15. The signal generator 32 may be of the selsyn, or other appropriate well-known type, and has an output transmitted by lines 33 and 34 which is proportional to slip or skid and is applied in conjunction with the output from the computer 18 in a sense which will increase or decrease the angle of bank signal appearing across the points 21 and 22 thereby causing the skid or slip to be overcome. A signal isolating device which for the purpose of the instant application may be represented to be the amplifier 30, which may comprise a standard form of amplifier with the signal from the signal generator 32 being applied to the grid of a vacuum tube (not shown) and the output taken from the cathode circuit and applied to the points 21, 22 of the coordinating computer 18, thereby serving to permit the transmission of signals through amplifier 30 in only one direction. Thus signals emanating from the signal generator 32 are transmitted through the amplifier 30 to affect or modify the computer output but signals from the computer output are prevented from affecting the signal generator 32, by virtue of the isolating quality of the amplifier 30.

While there are other instances in the several figures of the instant application wherein similar signal isolators could be advantageously employed, these so-called isolators have not been shown as they are well-known in the art and to include them would unneecssarily complicate the illustrations.

A stabilized azimuth reference is provided conveniently, in the form of a saturation compass or flux valve 37 mounted on the gyro vertical 23. The flux valve 37 is energized from a source 15 and is connected in a known manner to a selsyn 38 the output of which is amplified at 41. The output can be applied by switch 42 either to the turn control signal channel 16—17 or to a follow-up motor 43 which drives a differential selsyn 44 in a sense to keep the output of selsyn 38 zero as described below. Thusly, during a turn on rotation of the knob 11, cam 45 fixed to rotate with knob 11 will cause the arm 46 to be displaced from the detent 47 of the cam 45, closing contact point 48 and energizng lines 51 and 52 to the battery 53, thereby energizing the coil 54 of the solenoid 55 causing the switch 42 to be moved (to the left on the diagram) thereby to transmit the output from the amplifier 41 to energize the motor 43. The motor 43 rotates the selsyn 44 at a rate equal to the rate of turn of the craft, so that when the turn is stopped the craft will be controlled on its new heading. In straight flight, any residual heading error results in a flux valve error signal which causes the airplane to turn until the error is eliminated by reason of the error signal being transmitted along the lines 56' and 57' to the input of the computer 18, or, more particularly, any residual heading error will be productive of a signal across the points 16 and 17 and thence be transmitted as an input to the computer 18. Thereupon a signal serving to effect a heading change is created and this signal will persist until such time as the actual craft heading is in agreement with the predetermined heading. It is in this manner that the second factor for modifying the predetermined craft rate of turn is created within the system.

The vertical gyro 23 is also provided with signal generators for computing proper signals for transmission to the craft surface control mechanisms in accordance with the expressions as hereinbefore set forth. The signal generators, as will be explained, are in general required to produce outputs corresponding to the sine or cosine of the angle of displacement of the rotor and stator, as the case may be, and they can conveniently take the form of known single phase selsyn synchros which, when operated away from the position of full coupling have a cosinusoidal output function and when operated away from the position of zero coupling have a sinusoidal output function.

Located on the pitch axis of gyro 23 is a sine selsyn 58. By energizng the selsyn 58 with a signal that is proportional to predetermined craft rate of turn $(\dot{\phi})$, which is transmitted along the lines 35 and 36, an output will be produced that is proportional to the product of craft rate of turn and sine of the angle of elevation $(\dot{\phi} \sin \phi_E)$. This signal $(\dot{\phi} \sin \phi_E)$ is combined with a second signal which is proportional to the difference between actual craft bank angle and computed craft bank angle $(\phi_B - \phi'_B)$, and the combination applied as an input to an angular movement responsive inertial device located on a primary craft axis, or in this instance, located on the craft roll axis. The angular craft movement responsive inertial devices herein provided in each of the primary craft axes may be any of several well known types. The instant embodiment provides for torqued gyros for yielding craft control signals, but other similar devices such as rate gyros, the vibratory angular-velocity-responsive devices of Lyman Reissue 22,409 or angular accelerometers, would be satisfactory. Inasmuch as the exact nature of the signal emanating from the inertial device will depend upon the type of device employed (i. e. displacement, rate or acceleration-sensitive means), the signal that is eventually supplied to the servo-motors for the craft control surfaces will depend upon the amplifying circuit interconnecting the output from the inertial devices with the servo-motor. These control signals may contain components of rate, displacement or derivatives thereof the selection being more or less dependent upon the particular application in which the system is employed, and means for obtaining signal components responsive to rate, displacement, etc. are well known in the art.

The signal proportional to $(\dot{\phi} \sin \theta_E)$ and the signal proportional to $(\theta_B - \theta'_B)$ are, in the preferred embodiment, supplied to the two separate precession torquers 61' and 61 respectively, located on the gyro 62. The remaining instances wherein two or more independent signal sources are indicated as supplying signals to a single precession torquer, would also preferably provide a separate torquer for each signal (or other means for preventing intermixing of independent signals), but for reasons of simplicity, hereinafter only the single torquer is shown. The gyro 62, and the several other similar inertial devices appearing in the drawings are preferably provided with pick-off and torquer means (not shown) for maintaining the spin axis at right angles to the plane of the gimbal member, in a known manner. In response to the signals applied to the precession torquers 61 and 61' gyro 62 will precess at a rate propotional to the sum of those signals. Pick-off 63 is provided to produce a signal output proportional to the angular displacement of gyro 62 relative to the craft whereupon this last-mentioned signal is transmitted to appropriate aileron controls including amplifier means in a manner similar to that shown in Fig. 3.

The vertical gyro 23 is additionally provided, along its roll axis, with the cosine selsyn 64 and the sine selsyn 65 for computing the quantity $\dot{\phi} \cos \theta_B$ and the quantity $\dot{\phi} \sin \theta_B$ in the manner illustrated. The quantity $\dot{\phi} \cos \theta_B$ is transmitted along the lines 66 and 67 to a second cosine selsyn 68 located on the pitch axis of the vertical gyro 23. The output from this second cosine selsyn 68 is proportional to ($\dot{\phi}$ cos $\theta_B$ cos $\theta_E$), and this output is transmitted along the lines 71 and 72 to the precession torquer 73 located on the torqued gyro 74 which in this instance is used for supplying signals through the selsyn pick-off 75 to rudder control means. The output from the sine selsyn 65 is conducted by lines 76 and 77 to a cosine selsyn 78 located on the pitch axis of the vertical gyro 23 and is productive of an output proportional to ($\dot{\phi}$ sin $\theta_B$ cos $\theta_E$) which signal will be transmitted along the lines 81 and 82 to the precession torquer 83 located on the torqued gyro 84 thereby causing the selsyn pick-off 85 to produce a control signal which is transmitted to the elevator control means.

Gyros 74 and 84 are also provided with pick-off and torque means, not shown, for maintaining the spin axis at right angles to the plane of the gimbal member, in a known manner.

In order to provide means for effecting climbing turns, or other complex maneuvers, the signal generator 13 is pivoted by means of the mounting rod 86 in a manner to permit movement of the control knob 11 in accordance with predetermined angles of elevation. As the control knob 11 is moved backwardly or forwardly, selsyn 87, provided on the mounting rod 86 produces a signal in the lines 88 which signal will reflect the extent of motion of the control knob 11, or more specifically, which signal will be dependent upon the predetermined angle of elevation ($\theta_E$).

Operatively associated with the selsyn 87, by means of the transmission line 88, is a selsyn 91 located on the pitch axis of the vertical gyro 23. In order that the surface control devices hereinbefore mentioned be supplied the correct signals for producing craft control moments in accordance with a predetermined angle of elevation, signals proportional to the predetermined $\theta_E$ are supplied along the lines 92 and 93 to a cosine selsyn 94, and also to a sine selsyn 95, located on the roll axis of the vertical gyro 23. In this manner two output signals are generated; one signal appearing between the lines 96 and 97 is proportional to the quantity $\theta_E$ cos $\theta_B$ and this output is transmitted to the elevator control device in combination with the signal ($\dot{\phi}$ sin $\theta_B$ cos $\theta_E$) heretofore mentioned; and in a similar fashion, the second output originates in the sine selsyn 95, and appears across the transmission lines 98 and 99, and is proportional to the quantity $\theta_E$ sin $\theta_B$. This second signal is supplied to the rudder control device in cooperation with other signals ($\dot{\phi}$ cos $\theta_B$ cos $\theta_E$) also heretofore mentioned.

From the description thus far, it can be seen, in the system provided, that the craft may be controlled in straight and level flight by means of the torqued gyros that are provided on each of the three craft axes; or, if desired, a constant altitude rate of turn may be set in by means of the knob 11 whereupon a computed angle of bank will be maintained by the craft in accordance with the equations hereinbefore mentioned; or, if desired, a spiral turn may be evolved by presetting an appropriate angle of elevation in addition to the predetermined rate of turn, whereupon the proper signals will be produced by the devices mentioned and these signals will be productive of proper control signals for maintaining the craft in any of these predetermined maneuvers.

In Fig. 2, the details of the apparatus included in the computer 18 that appears in Fig. 1 are set forth. The object of this computer 18 is to receive a signal proportional to the predetermined craft rate of turn ($\dot{\phi}$) and to be capable of producing, as an output, a signal that is proportional to the bank angle that is correct, for that particular predetermined rate of turn. Thusly, the computed craft bank angle would be in accordance with the equation;

$$\theta'_B = \tan^{-1}\left(\frac{\dot{\phi} V \cos \theta_E}{g}\right)$$

Specifically, the apparatus of the computer includes a true air speed meter 111 which is coupled by means of the shaft 112 to a linear selsyn 113 in a manner whereby the shaft 112 is made to turn through an angle proportional to the craft velocity. An alternating current source 114 serves to energize the linear selsyn 113, and the output from the selsyn, appearing across the lines 115 and 116, is proportional to the craft velocity. A turn control knob 11 which may be the same turn control knob that was provided in the system of Fig. 1, and hence bearing the same number, is operatively associated with a linear selsyn 117. Upon rotation of the knob 11, a signal output from the selsyn 117 will be produced across lines 118 and 119 and that signal output will be in proportion to the product of the predetermined craft rate of turn, ($\dot{\phi}$) as set in the knob 11, and the craft velocity, (V) as measured by the meter 111. In Fig. 2, vertical gyro 23' is illustrated as provided with a cosine selsyn 122 positioned on its pitch axis. The output from the cosine selsyn 122 by virtue of the arrangement illustrated is therefore proportional to the product of the craft rate of turn, craft velocity and the cosine of the craft angle of elevation ($\dot{\phi}$V cos $\theta_E$). This output appears across transmission lines 123 and 124 and is transmitted thereby to a device that will produce an angular displacement that is proportional to the angle whose tangent is equal to that output.

More specifically, this output is applied across the wiper 125 and the field winding 127 of the motor 128. The wipper 125 is positionable on the auto-transformer 126 by means of the motor 128 which is energized by a source of alternating current 114. The alternating current source 114 is applied in series with the adjusting resistor 129 to the field winding 131 of the motor 128 and also to points 132 and 133 of the auto-transformer 126. In this manner the signal appearing across the lines 123 and 124 will cause the motor 128 to turn the shaft 134 through the gears 135 and 136 in an amount proportional to the signal supplied thereto. Further, the angular displacement of the wiper 125 from the vertical will be proportional to the angle whose tangent is proportional to the signal applied to the field winding 127, or more specifically in this instance, to the angle whose tangent is equal to the product $\dot{\phi}$V cos $\theta_E$. Directly associated with the shaft 134 is the selsyn 137, which is rotatable with the shaft 134 and the wiper 125. The selsyn 137 is energized with an alternating current source 114 and is rotated from a vertical position to an angle dependent on the value of the signal in the lines 138 and 139, and is therefore productive of an angular displacement proportional to the angle of bank as computed in the above-described manner. The vertical gyro 23' is also provided with a selsyn pick-off 141 which is located on the craft roll axis. An alternating current source 114 is provided for the selsyn 141 which thereby is productive of an output along lines 143 and 144 that is proportional to the actual craft bank angle. By connecting the actual craft bank angle signal in opposition to the computed craft bank angle signal in the manner illustrated, an output signal appearing across the points 144 and 139 will be produced which will reflect instantaneous deviation of the actual value from the computed value. This quantity appearing across points 139 and 144 is then applied to the aileron controls through the lines 21 and 22 that appear in Fig. 1, whereupon control moments are applied to the craft until such time as the signal in lines 139 and 144 becomes zero.

In the embodiment of the invention shown in Fig. 1, the aircraft is controlled jointly by the aircraft-axis gyros 62, 74 and 84, and the earth reference gyro 23. In some cases it may be desirable to cause the short period control to be performed practically entirely by the aircraft axis gyros.

The apparatus illustrated as connecting the torquer 61 of gyro 62 with the signal received from the earth reference gyro 23 and the coordinating computer 18, indicates how this may be accomplished in the case of the aileron control system. Similar apparatus may be added to the rudder and elevator control systems though not shown herein. A potentiometer 100 is arranged in leads 27, 28 in a manner that when the wiper 101 is in a downward position the sensitivity of the signal channel is reduced to a low value, and when the wiper 101 is in an upward position the sensitivity is at its full value. The wiper 101 is driven through stepdown gearing 102 by a motor 103 taking signals from leads 27 and 28 beyond the potentiometer. The motor is biased by a battery 104 so that the wiper 101 is normally slowly moved toward a down position and in normal steady state condition it rests in that down position. The signal from leads 27 and 28 is amplified and rectified in the amplifier 105 and applied to the motor 103 in a sense to move the wiper up (whatever the sense of the signal from leads 27 and 28) and thereby to increase the sensitivity of the channel on occurrence of such signal. A solenoid and plunger 108 is connected through leads 109 and 110 to the leads 51, 52 (the symbols A—A indicating the connecting point in the diagram) so that when the turn knob is moved from zero the wiper 101 is pulled upwardly. In operation in normal straight and level flight the wiper is down so that the signal from pickup 24 is greatly attenuated before reaching torquer 61. Short-period control of the aircraft is practically entirely by the gyro 62. Disturbances due to gusts, momentary changes of center of gravity, etc. are corrected by this gyro but if a persistent drift of the gyro 62 occurs, then a persistent error signal at 106, 107 gradually causes wiper 101 to rise, increasing the sensitivity of signal channel 27 and 28 so that the error signal from pick-off 24 can get through to torque gyro 62 in a sense to restore attitude. To make a turn, the knob 11 is moved from zero position. This energizes lines 110 and 109 until the condenser 50 is charged, but initially causing solenoid 108 to raise the wiper 101 to a full sensitivity position so that the airplane banks to the computed bank angle and is then stopped banking by the signal from the pick-off 24. Assuming that the computed bank angle is correct, the signal in leads 27 and 28 will shortly decrease to zero and the wiper will move downwardly so that during the turn the ailerons are controlled practically entirely by the gyro 62. Only if a persistent bank angle error develops at selsyn 24 will an effective corrective signal get through to the gyro 62. As hereinbefore stated the same expedient may advantageously be used on the pitch axis though not herein illustrated.

Figures 3, 5:
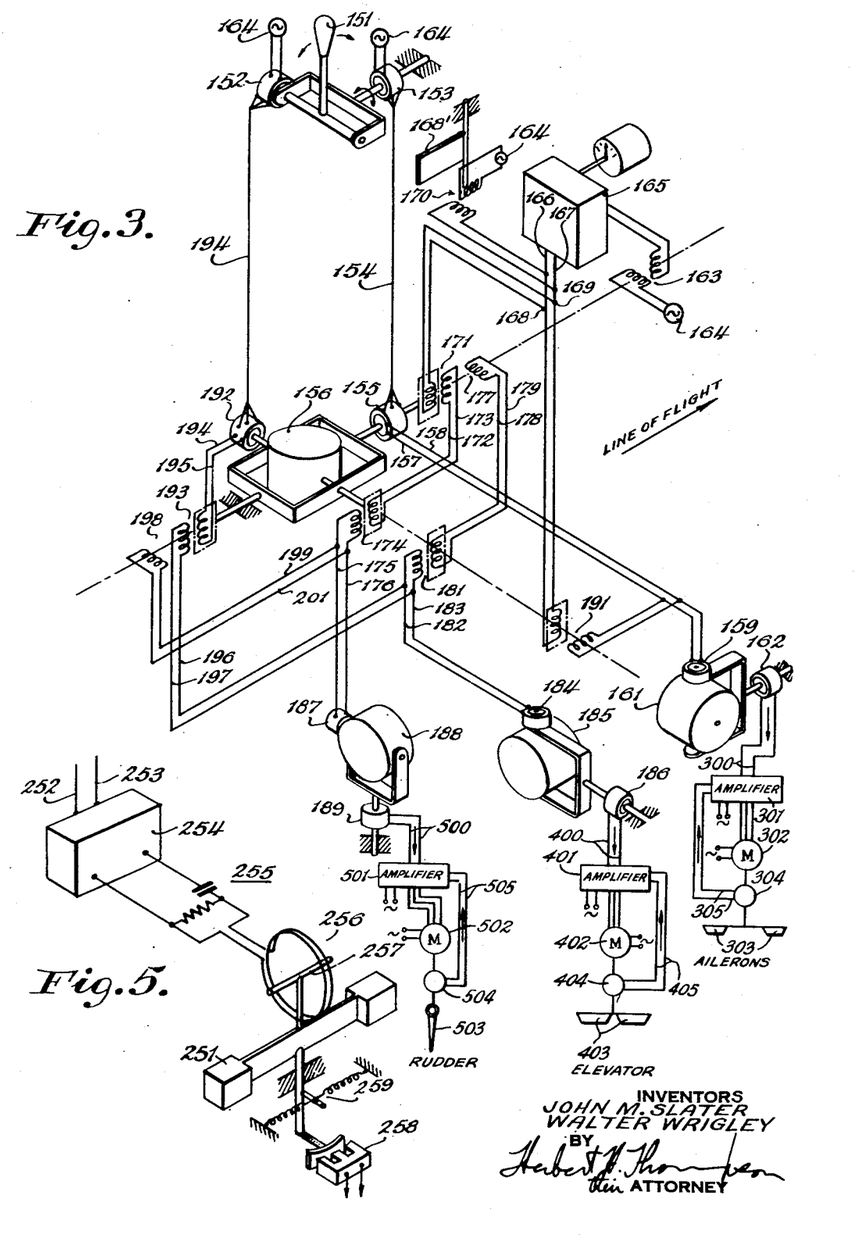
Fig. 3 is a schematic illustration of an alternative flight control system embodying features of the instant invention.
Fig. 5 illustrates schematically, an alternative inertial device for the systems set forth in Figs. 1 and 3.

Up to this point the system described and illustrated has been one in which craft rate of turn has been predetermined and proper control signals for achieving a proper craft bank angle for the desired rate of turn were determined by the system. However, the instant invention is not limited to such systems but also has equal application to systems wherein the craft bank angle is predetermined and proper control moments of the craft productive of a proper rate of turn for the predetermined bank angle, are determined by the system. A system meeting this requirement is illustrated in Fig. 3 wherein a control knob 151, of the type that may be moved in any direction is provided with selsyn 152 responsive to movement of knob 151 on the pitch axis, and with selsyn 153, responsive to movement of knob 151 on the roll axis. By displacing knob 151, craft angle of bank may be predetermined, or alternatively or additionally, craft angle of elevation may be predetermined. Selsyn 153, located on the craft roll axis and responsive to predetermined craft angle of bank, is operatively associated with selsyn 155 through the lines 154. Selsyn 155 is positioned on the roll axis of a vertical gyro 156 and upon receiving signals from the selsyn 153, will cause a corresponding output signal to appear between the lines 157, and 158 if the position of the gyro 156 in roll is in disagreement with the predetermined angle of bank. Thusly, upon the occurrence of a disagreement between selsyns 153 and 155, a signal will appear along the lines 157 and 158 which will be in proportion to that disagreement. When this signal is applied to the precession torquer 159, which is located on the torqued gyro 161, a precession of gyro 161 will be effected thereby causing the selsyn pick-off 162 to transmit a control signal to aileron control devices, hereinafter described. The aileron control devices having received a control signal will thereupon provide the craft with an angle of bank that is in accordance with the predetermined angle of bank as set in control knob 151. Thereupon the selsyn 163 also located on the craft roll axis being energized by the alternating current source 164 will transmit a signal into the computer 165 which will be proportional to the craft bank angle. The details of this computer will be described later but it is productive of an output across points 166 and 167 that is proportional to a rate of turn which would be proper for the predetermined bank angle, or more specifically the computed rate of turn $\Phi$ would be equal to $$\frac{g \tan \theta_B}{V \cos \theta_E}$$

As in the case wherein the rate of turn was predetermined the instant system provides a sideslip indicator including the vane 168′ positioned in the athwartship craft axis and is capable of operating the selsyn 170 which is energized by the source 164. This selsyn 170 is productive of a zero signal in the event the craft is free from sideslip, or in the event sideslip causes selsyn 170 to have a signal output, this output is applied in a sense that will increase or decrease the rate of turn signal appearing in conductors 168 and 169 causing the slip or skid to be overcome.

Having provided means for supplying a signal across points 168 and 169, which signal would be in accordance with computed craft rate of turn for a predetermined craft bank angle, the remainder of the system is similar in all major respects to the system set forth in Fig. 1. A signal responsive to the computed rate of turn is applied to a cosine selsyn 171 located on the roll axis of vertical gyro 156 and having its output connected by lines 172 and 173, to a cosine selsyn 174 which is located on the pitch axis of the vertical gyro 156. By this arrangement a signal appearing across lines 175 and 176 is produced which is proportional to ($\dot{\Phi}$ cos $\theta_B$ cos $\theta_E$). Similarly, a sine selsyn 177, located on the roll axis of the vertical gyro 156, is energized by the rate of turn signal ($\dot{\Phi}$) and is thereby productive of an output appearing along lines 178 and 179 which is proportional to the rate of turn times the sine of the craft bank angle. This signal is fed into the cosine selsyn 181 located on the pitch axis of the vertical gyro 156 thereby enabling the selsyn 181 to have an output along lines 182 and 183 which is proportional to ($\dot{\Phi}$ sin $\theta_B$ cos $\theta_E$). This signal is applied to the precession torquer 184 located on the gyro 185 which upon precession causes an output signal to be produced in the selsyn pick-off 186 which in turn is transmitted to, in this instance, elevator control devices, hereinafter described.

A similar precession torquer 187 is provided on the gyro 188 for receiving signals transmitted by the lines 175 and 176 and thereby causes, upon precession of the gyro 188, a control signal to appear in the selsyn 189 which in turn is transmitted to rubber control devices, hereinafter described.

A third selsyn 191 of the sinusoidal type is located on the pitch axis of the vertical gyro 156 and upon receiving signals responsive to the rate of turn ($\dot{\Phi}$) by lines 168 and 169 produces an output signal proportional to the craft rate of turn times the sine of the angle of elevation, which signal is applied to the precession torquer 159 of the aileron gyro 161.

Gyros 161, 185 and 188 are also provided with pick-off and torque means, not shown, for maintaining the spin axis at right angles to the plane of the gimbal members, in a known manner.

As the control knob 151 is moved backwardly or forwardly, the selsyn 152 being energized by the alternating current source 164 will cause a signal to be transmitted along the conductors 194 whenever a disagreement exists between the position of the selsyn 152 and a selsyn 192 which is located on the pitch axis of the vertical gyro 156. In the event a signal is produced as an output from selsyn 192, this signal will be responsive to predetermined craft angle of elevation and will be transmitted by lines 194, 195 to the cosine selsyn 193. Inasmuch as the cosine selsyn 193 is located on the roll axis of the vertical gyro 156, the output from selsyn 193 will be proportional to the craft angle of elevation times the cosine of the craft bank angle, and this output will appear across lines 196 and 197 and will be transmitted thereby to the elevator gyro precession torquer 184.

Sine selsyn 198 similarly modifies the signal to the rudder gyro precession torquer 187 by supplying thereto a signal, transmitted by lines 199 and 201, that is proportional to the craft angle of elevation times the sine of the craft bank angle. In this manner, through control of the knob 151 a predetermined bank angle will be accompanied by a computed rate of turn that will be proper for that particular bank angle and furthermore, if desired, a predetermined craft angle of elevation may also be provided whereupon the system of Fig. 3 will produce proper control signals for achieving proper control moments of the craft that will be productive of a desired maneuver. A flux valve with pick-off and differential selsyn similar to that illustrated in Fig. 1 may be incorporated into the system of Fig. 3 to provide a heading reference.

The aileron, elevator and ruder control devices hereinafter referred to may each comprise a conventional servomotor system as illustrated in Fig. 3. For example, the signal from selsyn 162 may be transmitted over leads 300 to a conventional amplifier 301, the output of which controls the direction and rate of rotation of a servomotor 302. Motor 302 is mechanically connected to operate the ailerons 303 in a conventional manner and a signal generator 304 is also driven by motor 302 to provide a signal proportional to the output displacement of the motor which is fed back along leads 305 in degenerative fashion to the amplifier 301. In this manner, the displacement output of the servomotor is proportional to the magnitude of the input signal. Furthermore, the servomotor system is of a phase sensitive nature such that the direction of operation of the motor will depend upon the phase of the signal derived from the selsyn 162. Similarly, the signal from selsyn 186 is supplied to leads 400 in controlling relation to amplifier 401 which controls servomotor 402 which in turn operates the elevators 403. The displacement repeat-back signal is derived from signal generator 404 and is fed back to the amplifier over leads 405. The rudder is also driven in accordance with the signal output derived from selsyn 189 through a similar servomotor system. Briefly, this comprises the leads 500 which connect selsyn 189 with amplifier 501, the output of amplifier 501 controlling motor 502 which drives rudder 503. Signal generator 504 provides a repeat-back signal which is supplied along leads 505 in degenerative fashion to the amplifier 501. It will be noted that the servomotor systems herein disclosed are exemplary in character and are intended to be conventional such that a phase sensitive operation thereof may be obtained in any well known manner.

Figure 4:
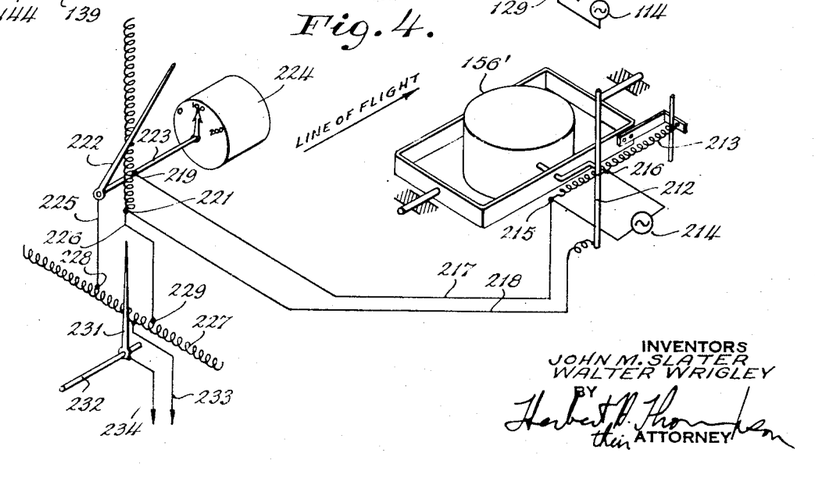
Fig. 4 is a schematic illustration of a computer mechanism for the system of Fig. 3.

Fig. 4 illustrates in detail the component parts of the computer 165 that appears in the system of Fig. 3. As in the case of the computer 18, described in detail in relation to Fig. 2, certain parts of the computer 165 are illustrated in Fig. 4 as being enclosed within the computer itself. More particularly, the vertical gyro 156' is illustrated for reasons of simplicity as being a part of the computer.

Referring now to Fig. 4, the vertical gyro 156' is provided with an offset wiper arm 212 which is adapted to travel on the winding of an autotransformer 213, which autotransformer is provided with an alternating current source 214 applied to points 215 and 216. Upon motion of the craft about the pitch axis, wiper 212 will be displaced along the autotransformer winding 213 and will be productive of an output signal on lines 217 and 218 in an amount proportional to the secant of the angle of elevation. By applying this signal to the points 219 and 221 of a second autotransformer, which is equipped with a wiper 222 that is in turn attached by means of the shaft 223 to the airspeed device 224, an output signal may be obtained across lines 225 and 226 which would be substantially in proportion to the secant of the craft angle of elevation divided by the craft velocity; or, as the secant is the reciprocal of the cosine, the signal appearing across points 225 and 226 will be in proportion to the reciprocal of the craft velocity times the cosine of the craft angle of elevation.

As it is desired to obtain the tangential function of this reciprocal quantity, a third autotransformer 227 is provided and is supplied with a signal proportional to this reciprocal function at points 228 and 229. Wiper arm 231 is attached by a shaft 232 to the vertical gyro 156' in any suitable manner, though not shown, whereby arm 231 will be displaced from the vertical in accordance with the craft bank angle. By obtaining an output from the center tapped line 233 and the wiper arm 231, a computed output will be produced that will be proportional to the tangent of the craft bank angle divided by the product of the craft rate of turn and the cosine of the craft angle of elevation. This signal would be applied in Fig. 3 to points 166 and 167 and thereby complete the detail of the computer unit 165.

While the apparatus described in relation to all the figures have been shown as adapted to supply proper signals to angular movement responsive inertial means of the torqued gyro type, the same principles may be employed in systems using angular acceleration measuring devices. Thusly, Fig. 5 illustrates a yaw accelerometer 251 which may be provided in lieu of, for instance, the torqued gyro 188 of Fig. 3. The signal that is proportional to the rate of turn times the cosine of the angle of bank times the cosine of the angle of elevation is received, in this case, along the lines 252 and 253 and is applied to the amplifier 254 and also rectified therein. This amplified and rectified signal is then supplied to the differentiating network 255 whereupon the resulting signal from the differentiating network is applied to produce a bias torque on the coil 256 thereby causing a displacement of the rotor 257 located within the field of coil 256 and thereby productive of an angular displacement of the accelerometer 251.

Upon displacement of the accelerometer 251, a signal pick-off device illustrated at 258 is provided to transmit control signals to the surface control device (the rudder control device in this instance). A calibrated spring 259 maintains the accelerometer 251 in a neutral position during the absence of control signals and serves to restrain accelerometer movement in a manner to provide a displacement responsive to acceleration when a signal is supplied thereto. This same arrangement may be alternatively used in the same configuration on the pitch axis controls, or, more particularly, in control of the elevator surface controls. However, if incorporated to supply signals to the roll axis controlling devices (the ailerons), a differentiator would be required only in the leads from the sine selsyn 191 of Fig. 3 but not in the lines 157 and 158, which latter lines transmit the signal proportional to the predetermined angle of bank.

What is claimed is:

1. An automatic flight control apparatus for dirigible craft having signal responsive devices for supplying control moments thereto, said apparatus comprising means for producing control signals dependent upon craft deviation from a predetermined attitude, inertial angular-movement-responsive means for producing control signals dependent on angular movement about the primary craft axes, means for modifying said produced control signals to effect predetermined craft angle of elevation, means for further modifying said produced control signals in accordance with measures of craft rate of turn and craft bank angle, said last mentioned means including a computing mechanism for determining one of said measures from a predetermined value of the other of said measures.

2. An automatic flight control apparatus for dirigible craft having signal responsive devices for supplying control moments thereto, said apparatus comprising a three-axis reference device, pick-off means for each axis of said reference device for producing control signals responsive to craft deviation from predetermined attitude, inertial means for producing control signals responsive to angular movement about the primary craft axes, means for modifying said produced control signals to effect a predetermined craft angle of elevation, means for further modifying said produced control signals in accordance with measures of craft rate of turn and craft bank angle, said last mentioned means including a computing mechanism for determining one of said measures from a predetermined value of the other of said measures.

3. An automatic flight control apparatus for dirigible craft having signal responsive devices for supplying control moments thereto, said apparatus comprising means for supplying control signals dependent upon craft deviations from a predetermined attitude, means for supplying control signals dependent on angular craft movement, means for modifying said control signals to effect control moments productive of predetermined craft angle of elevation, means for producing two additional modifying signals respectively dependent upon craft rate of turn and craft angle of bank, the value of one of said last-mentioned modifying signals being manually set in and means for computing the value of the other in accordance with the set in value, and means for modifying the operation of said signal responsive devices in accordance with said two additional modifying signals.

4. In an automatic flight control system for a craft, means for coordinating craft bank angle with predetermined craft rate of turn including a first signal producing means having an output corresponding to a predetermined rate of turn, a craft air speed measuring device, a second signal producing means having an output dependent upon craft air speed, and computing means having an output proportional to a tangential function of the product of the outputs from said first and second signal producing means.

5. In an automatic flight control system for a dirigible craft, means for coordinating craft bank angle with predetermined craft rate of turn including a first signal producing means having an output dependent upon the predetermined rate of turn, a device for measuring craft air speed, a second signal producing means having an output dependent upon said craft air speed, means for measuring craft angle of elevation, a third signal producing means having an output dependent upon a cosine function of said craft angle of elevation, and computing means having an output dependent upon a tangential function of the product of outputs from said first, second and third signal producing means.

6. In an automatic flight control system for a dirigible craft, the combination of means having an output signal responsive to actual craft bank angle, means having an output signal responsive to a computed craft bank angle for a given rate of turn, and circuit means having an output dependent upon the difference between said signals, said computing means including a craft air speed measuring device, a craft angle of elevation measuring device, pick-off means having an output dependent upon the product of the rate of turn, said air speed, and a cosine function of said angle of elevation, and means for determining the angle whose tangent is proportional to said product.

7. In a turn control for a dirigible craft, a computer for producing an error signal dependent upon disagreement between actual and computed craft bank angle for a preselected craft rate of turn, said computer comprising first signal producing means having an output in accordance with predetermined rate of turn, second signal producing means having an output in accordance with craft air speed, third signal producing means having an output in accordance with the cosine function of craft angle of elevation, means for obtaining a fourth signal proportional to the product of said first, second and third signals, means for computing the angle whose tangent is equal to said fourth signal, and means for producing a fifth signal in accordance with actual craft bank angle.

8. In a flight control system for a dirigible craft, means for measuring craft angle of elevation, a pick-off for said means having an output dependent upon a sinusoidal function of said craft angle of elevation, means having an output signal dependent upon predetermined craft rate of turn, and computing means having a signal output proportional to the product of said rate of turn and said sinusoidal function of angle of elevation.

9. In a flight control system for a dirigible craft, means for producing a first output signal in accordance with predetermined craft rate of turn, means responsive to craft angle of elevation, a pick-off on said last mentioned means for producing a second output signal dependent upon a cosinusoidal function of said craft angle of elevation, means responsive to craft bank angle, a pick-off for producing a third output signal dependent upon a sinusoidal function of said craft bank angle, and computing means having an output responsive to the product of said first, second and third output signals.

10. In a flight control system for dirigible craft, means for producing a first output signal in accordance with predetermined craft rate of turn, means responsive to craft angle of elevation including a pick-off for producing a second output signal in accordance with a cosinusoidal function of said angle of elevation, means responsive to craft angle of bank including means for producing a third output signal in accordance with a cosinusoidal function of said bank angle, and computing means responsive to the product of said first, second and third output signals.

11. In an automatic flight control system for a dirigible craft, means for coordinating craft rate of turn with predetermined craft bank angle including a first signal producing means having an output dependent upon the bank angle of the craft, a craft air speed measuring device, a second signal producing means having an output proportional to craft air speed, and computing means having an output responsive to a tangential function of the output from said first signal producing means divided by the output from said second signal producing means.

12. In an automatic flight control system for a dirigible craft, means for coordinating craft rate of turn with predetermined craft bank angle, including a first signal producing means having an output dependent upon said predetermined craft bank angle, a device for measuring craft air speed, a second signal producing means having an output dependent upon said craft air speed, means for measuring craft angle of elevation, a third signal producing means having an output dependent upon a cosine function of said craft angle of elevation, and computing means having an output dependent upon a tangential function of the output from said first signal producing means and said function divided by the product of outputs from said second and third signal producing means.

13. In an automatic flight control system for a dirigible craft, the combination of means having an output dependent upon craft bank angle, means for producing an output signal proportional to computed craft rate of turn for a predetermined craft bank angle, and circuit means for transmitting said computed rate of turn signal to produce craft control moments proportional thereto, said computing means including a craft air speed measuring device, means for producing a first signal dependent on said air speed measuring device, means having an output dependent upon craft angle of elevation, means for producing a second signal dependent upon a cosine function of said craft angle of elevation, and means for producing an output signal dependent on a tangential function of said predetermined craft bank angle, and divided by the product of said first and second signals.

14. In a flight control system for a dirigible craft, means for measuring craft angle of elevation, a pick-off for said means having an output dependent upon a sinusoidal function of said craft angle of elevation, means having an output signal dependent upon the craft bank angle, means having an output dependent upon craft rate of turn for a predetermined craft bank angle, and computing means having an output dependent upon the product of said craft rate of turn and said sinusoidal function of craft angle of elevation.

15. In a flight control system for dirigible craft, means for producing an output in accordance with predetermined craft bank angle, means for producing a first signal proportional to craft rate of turn as computed from said predetermined craft bank angle, means responsive to craft angle of elevation, a pick-off on said last-mentioned means for producing a second signal dependent upon a cosinusoidal function of said craft angle of elevation, means for producing a third signal responsive to a sinusoidal function of said craft bank angle, and computing means having an output responsive to the product of said first, second and third signals.

16. In a flight control system for a dirigible craft, means for producing an output dependent upon a predetermined craft bank angle, means for producing a first signal proportional to craft rate of turn as computed from said predetermined craft bank angle, means responsive to craft angle of elevation including a pick-off for producing a second signal proportional to a cosinusoidal function of said angle of elevation, means for producing a third signal proportional to a cosinusoidal function of craft angle of bank, and computing means responsive to the product of said first, second, and third signals.

17. In an automatic flight control system for a dirigible craft, means for supplying craft control movements comprising means for computing the centrifugal acceleration active on said craft including means having an output responsive to craft air speed and means having an output responsive to craft rate of turn, means for providing an output proportional to a cosinusoidal function of craft angle of elevation, and a computing means for producing a control signal responsve to the product of all of said outputs.

18. Flight control apparatus for craft and missiles comprising inertial signal producing devices, one of which produces a control signal responsive to angular movement of the craft about each of the primary craft axes to normally maintain straight and level flight, settable means operatively associated with each of the said inertial signal devices to alter said control signals to cause turn about any desired axis, an attitude reference stabilized with respect to the earth, and resolving means associated with said attitude reference for apportioning said altered signals between the several inertial devices depending on the tilt of the craft axes whereby the desired rate of turn about the desired axis is secured regardless of the craft's attitude.

19. Flight control apparatus for crafts and missiles comprising inertial signal producing devices responsive to angular movement of the craft about each of the primary craft axes to normally maintain straight and level flight, settable means operatively associated with each of said inertial devices to alter said signals to cause craft turn about any desired axis, an attitude reference stabilized with respect to the earth, and resolving means associated with said attitude reference for apportioning said altered signals between the several inertial devices depending on the tilt of the craft axes in a sense to render the net control signals zero when the craft is executing the maneuver demanded by the said settable means.

20. In an automatic steering apparatus, an inertial device having means for producing a signal responsive to yaw, a magnetic compass device having a pick-off for producing a signal responsive to heading deviations, normally ineffective follow-up means for zeroing said pick-off, steering means normally responsive to the combination of signals from said devices, a turn control including means for biasing said yaw responsive signal to produce yaw, and means brought into action by said turn control causing said compass signal to be diverted from said steering means and applied to cause said follow-up means to zero said compass pick-off.

21. In an automatic stabilizing means for aircraft, a free gyroscope having freedom about the roll axis of the craft, a second free gyroscope having freedom about the pitch axis, servo means controlled from both gyroscopes for maintaining level flight, and means for preventing wandering of said gyroscopes about said roll and pitch axes respectively including a gyro vertical, and means responsive to tilt of the craft with respect to said gyro vertical for precessing said roll and pitch gyroscopes respectively back to ther normal attitude at a limited maximum rate of precession.

22. In an automatic stabilizing means for aircraft, free gyroscope means having signal producing pick-offs responsive to craft roll and craft pitch, servo means controlled from said signals for maintaining level flight, and means for preventing wandering of said gyroscope means about said roll and pitch axes respectively including a gyro vertical, and means responsive to tilt of the craft with respect to said gyro vertical for precessing said free gyroscope means back to a normal attitude at a limited maximum rate of precession.

23. In an automatic stabilizing means for aircraft, an inertial device responsive to movement about the roll axis of the craft, a second inertial device responsive to movement about the pitch axis of the craft, servo means controlled from both inertial devices for maintaining level flight and means for preventing deviations of said inertial device about said roll and pitch axes respectively, including a vertical reference and means responsive to tilt of the craft with respect thereto for slowly re-positioning said roll and pitch inertial device respectively back to their normal position.

24. In an automatic stabilizing means for aircraft, an inertial device responsive to movement about the roll axis of the craft, a second inertial device responsive to movement about the pitch axis of the craft, a third inertial device responsive to movement about the yaw axis of the craft, servo means controlled from each of the said inertial devices for maintaining straight and level flight, and means for preventing deviations of said inertial devices about said primary axes respectively, including a vertical reference and an azimuth reference device, and means responsive to craft angular error with respect to said vertical and azimuth reference devices, respectively, for slowly re-positioning said inertial devices respectively back to their normal position.

25. In flight control apparatus for aircraft, inertial means responsive to angular movements of the aircraft with respect to space about at least the roll and pitch axes and arranged to produce signals on occurrence of such movements, servo means operated by the signals and adapted to apply corrective control forces to the airplane to counteract such movements, means defining a reference with respect to the earth, signal producing means responsive to relative tilt of the aircraft and reference means, a signal channel coupling the tilt signal producing means and the inertial device signal producing means whereby the tilt signal can overpower the inertial device signal, means in said channel operative on decay of the tilt signal for limiting the tilt signal channel sensitivity to a low value, and means operated by the tilt signal for slowly raising the limit in the presence of persistent tilt signal, whereby short-period angular movements of the aircraft in space are corrected mainly by the inertial means and persistent tilt of the aircraft relative to the earth is corrected by the earth reference means.

26. Flight control apparatus for aircraft comprising aircraft control means for producing angular movements of said craft about an axis thereof, a first means sensitive to a rate of angular movement of said craft about said axis for controlling said aircraft control means to restore said craft to its initial position following relatively short period angular deviations thereof, means defining a space axis coincident with said craft axis, a second means associated with said space axis-defining means and responsive to angular deviations of said craft about said space axis for controlling said aircraft control means in accordance with relatively long period angular deviations of said craft to restore said craft to its initial position relative to said space-axis-defining means, and means for normally providing a relatively small degree of control by said second means over said aircraft control means but for increasing the degree of control of said second means over said aircraft control means in accordance with the time interval during which an angular deviation of said aircraft about said space axis may persist.

27. Flight control apparatus for aircraft comprising aircraft control means for producing angular movements of said craft about mutually perpendicular axes thereof, rate gyros respectively responsive to angular rates of movement of said craft about said axes, means including first signal pick-offs associated with said rate gyros for controlling said aircraft control means respectively to restore said craft to its initial attitude following relatively short period angular deviations of said craft about said axes, means including a gyro vertical for defining space axes coincident with said craft axes, means including second signal pick-offs associated with said gyro vertical for respectively controlling said aircraft control means in accordance with relatively long period angular deviations of said craft about said axes to restore said craft to its initial attitude relative to said space-axes defining means, and means for normally providing a relatively small signal from said second signal pick-offs to said aircraft control means respectively but for increasing the signal supplied from said second signal pick-offs to said aircraft control means as a function of the time of duration of the signal from said second pick-offs, respectively.

28. Flight control apparatus for aircraft comprising aircraft control means for producing angular movements of said craft about an axis thereof, a rate gyro sensitive to angular rates of movement of said craft about said axis, said rate gyro including a torquer and a first signal pick-off, means responsive to the output of said first signal pick-off for controlling said aircraft control means to restore said craft to its initial position following relatively short period angular deviations thereof about said axis, means defining a space axis coincident with said craft axis including a second signal pick-off for detecting angular movement of said craft about said space axis, means for controlling the torquer of said rate gyro in accordance with the signal developed in said second pick-off whereby to control said aircraft control means in accordance with relatively long period angular deviations of said craft in a manner to restore said craft to its initial position relative to said space axis, and means for normally supplying a relatively small signal from said second pick-off to the torquer of said rate gyro but for increasing the signal so supplied in accordance with the magnitude and persistence time of the signal output of said second signal pick-off.

29. In a flight control system for aircraft, means defining a pitch attitude reference for said craft about its pitch axis, means defining a second attitude reference about a second of the craft's axes, means responsive to said second attitude reference for controlling the attitude of said craft about said second axis, and means operatively associated with said pitch reference-defining means for modifying the operation of said attitude controlling means in accordance with the angular displacements of said craft about the craft's pitch axis.

30. In a flight control system for aircraft, means defining a pitch attitude reference for said craft about its pitch axis, signal-responsive means for controlling movements of the craft about a second of the craft's axes, a signal producing means connected to supply signals to said signal-responsive means, and means operatively associated with said pitch reference and connected in circuit with said signal-producing means for varying the signal supplied to said signal-responsive means in accordance with angular displacements of said craft about its pitch axis.

31. A flight control system of the character recited in claim 29 in which the second craft's axis is its roll axis.

32. A flight control system of the character recited in claim 29 in which the second craft's axis is its azimuth axis.

33. In a flight control system for aircraft, means defining a pitch attitude reference for said craft about its pitch axis, signal-responsive means for controlling movements of the craft about a second of the craft's axes, a signal producing means connected to supply signals to said signal-responsive means, and means operatively associated with said pitch reference-defining means and connected in circuit with said signal-producing means for varying the signal supplied to said signal-responsive means as a function of the angular displacement of the craft about its pitch axis.

34. In a flight control system for aircraft, means defining a pitch attitude reference for said craft about its pitch axis, rudder control and aileron control means for controlling movements of said craft in azimuth, and means for modifying the operation of both said rudder control and aileron control means as cosine and sine functions, respectively, of the pitch angle of said craft.

JOHN M. SLATER.
WALTER WRIGLEY.

References Cited in the file of this patent
UNITED STATES PATENTS

| Number | Name | Date |
|---|---|---|
| 2,066,194 | Bates | Dec. 29, 1936 |
| 2,115,498 | Rieper | Apr. 26, 1938 |
| 2,137,974 | Fischel | Nov. 22, 1938 |
| 2,190,390 | Thiry | Feb. 13, 1940 |
| 2,371,388 | Glenny | Mar. 13, 1945 |
| 2,439,750 | Nisbet et al. | Apr. 13, 1948 |
| 2,464,629 | Young | Mar. 15, 1949 |